United States Patent [19]
Wilkinson et al.

[11] Patent Number: 5,765,012
[45] Date of Patent: *Jun. 9, 1998

[54] CONTROLLER FOR A SIMD/MIMD ARRAY HAVING AN INSTRUCTION SEQUENCER UTILIZING A CANNED ROUTINE LIBRARY

[75] Inventors: Paul Amba Wilkinson, Apalachin; Thomas Norman Barker, Vestal; James Warren Dieffenderfer, Owego; Peter Michael Kogge, Endicott; Donald Michael Lesmeister; Robert Reist Richardson, both of Vestal; Vincent John Smoral, Endwell, all of N.Y.

[73] Assignee: International Business Machines Corporation, Armonk, N.Y.

[*] Notice: The term of this patent shall not extend beyond the expiration date of Pat. No. 5,625,836.

[21] Appl. No.: 292,943

[22] Filed: Aug. 18, 1994

Related U.S. Application Data

[63] Continuation of Ser. No. 887,459, May 22, 1992, abandoned, which is a continuation-in-part of Ser. No. 611,594, Nov. 13, 1990, abandoned, and Ser. No. 798,788, Nov. 27, 1991, abandoned.

[51] Int. Cl.$^6$ .................................................. G06F 15/80
[52] U.S. Cl. .................................... 395/800.16; 395/595
[58] Field of Search .............................. 395/800, 379, 395/395, 596, 597, 598

[56] References Cited

U.S. PATENT DOCUMENTS 3,537,074  10/1970  Stokes et al. .
3,544,973  12/1970  Borck et al. .

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |
| 460599A3 | 12/1991 | European Pat. Off. . |
| 485690A2 | 5/1992 | European Pat. Off. . |
| 493876A2 | 7/1992 | European Pat. Off. . |
| 59-016071 | 1/1984 | Japan . |
| 2223867 | 4/1990 | United Kingdom . |
| 89/09967 | 4/1988 | WIPO . |
| 92/06436 | 4/1992 | WIPO . |

OTHER PUBLICATIONS

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

H.P. Bakoglu, "Second–Level Shared Cache Implementation For Multiprocessor Computers With A Common Interface For The Second–Level Shared Cache And The Second–Level Private Cache", IBM Technical Disclosure Bulletin, vol. 33, No. 11, pp. 362–365, Apr. 1991.

Mansingh et al., "System Level Air Flow Analysis for a Computer System Processing Unit", Hewlett–Packard Journal, vol. 41 No. 5, Oct. 1990, pp. 82–87.

(List continued on next page.)

Primary Examiner—Richard L. Ellis
Attorney, Agent, or Firm—Lynn L. Augspurger

[57] ABSTRACT

A controller for a SIMD processor array that can execute instructions within each processing element is described. This three stage hierarchical controller executes instructions at the function, routine, and micro-level, to maximize the effectiveness of processing within the array elements themselves. The routine sequencer is hardwired to perform looping and flow control operations using DO/WHILE, IF/THEN/ELSE, and GO-SUB constructs. A pipeline is provided to maintain a steady flow of commands to the array, and means is provided to monitor command execution progress and to provide feedback of progress to the stages of the controller.

22 Claims, 3 Drawing Sheets

U.S. PATENT DOCUMENTS

| | | |
|---|---|---|
| 3,970,993 | 7/1976 | Finnila . |
| 4,101,960 | 7/1978 | Stokes et al. . |
| 4,107,773 | 8/1978 | Gilbreath et al. . |
| 4,270,170 | 5/1981 | Reddaway . |
| 4,314,349 | 2/1982 | Batcher .................................. 364/716 |
| 4,338,675 | 7/1982 | Palmer et al. ........................ 364/748 |
| 4,380,046 | 4/1983 | Fung . |
| 4,394,726 | 7/1983 | Kohl . |
| 4,412,303 | 10/1983 | Barnes et al. . |
| 4,435,758 | 3/1984 | Lorie et al. . |
| 4,467,422 | 8/1984 | Hunt . |
| 4,468,727 | 8/1984 | Carrison . |
| 4,498,133 | 2/1985 | Bolton et al. . |
| 4,523,273 | 6/1985 | Adams, III et al. . |
| 4,598,400 | 7/1986 | Hillis ....................................... 370/60 |
| 4,604,695 | 8/1986 | Widen et al. . |
| 4,621,339 | 11/1986 | Wagner et al. . |
| 4,622,650 | 11/1986 | Kulisch ................................... 364/748 |
| 4,706,191 | 11/1987 | Hamstra et al. . |
| 4,720,780 | 1/1988 | Dolecek . |
| 4,736,291 | 4/1988 | Jennings et al. . |
| 4,739,474 | 4/1988 | Holsztynski . |
| 4,739,476 | 4/1988 | Fuduccia . |
| 4,748,585 | 5/1988 | Chiarulli . |
| 4,763,321 | 8/1988 | Calvignac et al. .................... 370/94 |
| 4,780,873 | 10/1988 | Mattheyses ............................ 370/94 |
| 4,783,738 | 11/1988 | Li et al. . |
| 4,783,782 | 11/1988 | Morton ................................... 371/11 |
| 4,805,091 | 2/1989 | Thiel et al. . |
| 4,809,159 | 2/1989 | Sowa . |
| 4,809,169 | 2/1989 | Sfarti et al. . |
| 4,809,347 | 2/1989 | Nash et al. ............................. 382/49 |
| 4,814,980 | 3/1989 | Peterson et al. ...................... 395/200 |
| 4,825,359 | 4/1989 | Ohkami et al. . |
| 4,831,519 | 5/1989 | Morton . |
| 4,835,729 | 5/1989 | Morton . |
| 4,841,476 | 6/1989 | Mitchell et al. . |
| 4,847,755 | 7/1989 | Morrison et al. . |
| 4,849,882 | 7/1989 | Aoyama et al. . |
| 4,852,048 | 7/1989 | Morton . |
| 4,855,903 | 8/1989 | Carleton et al. . |
| 4,858,110 | 8/1989 | Miyata . |
| 4,860,201 | 8/1989 | Stolfo et al. . |
| 4,872,133 | 10/1989 | Leeland ................................. 364/748 |
| 4,873,626 | 10/1989 | Gifford .................................. 395/800 |
| 4,891,787 | 1/1990 | Gifford . |
| 4,896,265 | 1/1990 | Fiduccia et al. . |
| 4,901,224 | 2/1990 | Ewert . |
| 4,901,360 | 2/1990 | Shu et al. .............................. 395/800 |
| 4,903,260 | 2/1990 | Boettle et al. ........................ 370/60 |
| 4,905,143 | 2/1990 | Takahashi et al. . |
| 4,907,148 | 3/1990 | Morton . |
| 4,910,665 | 3/1990 | Mattheyses et al. . |
| 4,916,652 | 4/1990 | Schwarz ................................ 364/748 |
| 4,916,657 | 4/1990 | Morton . |
| 4,920,484 | 4/1990 | Ranade . |
| 4,922,408 | 5/1990 | Davis et al. . |
| 4,925,311 | 5/1990 | Neches et al. . |
| 4,933,846 | 6/1990 | Humphrey et al. . |
| 4,933,895 | 6/1990 | Grinberg et al. ..................... 364/748 |
| 4,942,516 | 7/1990 | Hyatt . |
| 4,942,517 | 7/1990 | Cok . |
| 4,943,912 | 7/1990 | Aoyma et al. . |
| 4,956,772 | 9/1990 | Neches . |
| 4,958,273 | 9/1990 | Anderson et al. . |
| 4,964,032 | 10/1990 | Smith . |
| 4,967,340 | 10/1990 | Dawes . |
| 4,975,834 | 12/1990 | Xu et al. . |
| 4,985,832 | 1/1991 | Grondalski . |
| 4,992,926 | 2/1991 | Janke et al. . |
| 4,992,933 | 2/1991 | Taylor ................................... 395/375 |
| 5,005,120 | 4/1991 | Ruetz . |
| 5,006,978 | 4/1991 | Neches . |
| 5,008,815 | 4/1991 | Hillis . |
| 5,008,882 | 4/1991 | Peterson et al. ..................... 370/94.3 |
| 5,010,477 | 4/1991 | Omoda et al. . |
| 5,016,163 | 5/1991 | Jesshope et al. . |
| 5,020,059 | 5/1991 | Gorin et al. .......................... 371/11.3 |
| 5,021,945 | 6/1991 | Morrison et al. . |
| 5,038,282 | 8/1991 | Gilbert et al. . |
| 5,038,386 | 8/1991 | Li ............................................ 382/49 |
| 5,041,189 | 8/1991 | Tamitani . |
| 5,041,971 | 8/1991 | Carvey et al. . |
| 5,045,995 | 9/1991 | Levinthal et al. . |
| 5,047,917 | 9/1991 | Athas et al. . |
| 5,049,982 | 9/1991 | Lee et al. ............................... 357/81 |
| 5,056,000 | 10/1991 | Chang . |
| 5,072,217 | 12/1991 | Georgiou et al. ................... 340/825.79 |
| 5,113,523 | 5/1992 | Colley et al. ........................ 395/800 |
| 5,121,498 | 6/1992 | Gilbert et al. ....................... 395/700 |
| 5,136,582 | 8/1992 | Firoozmand ......................... 370/85.1 |
| 5,142,540 | 8/1992 | Glasser ................................. 371/40.1 |
| 5,146,608 | 9/1992 | Hillis ..................................... 395/800 |
| 5,165,023 | 11/1992 | Gifford ................................. 395/325 |
| 5,170,482 | 12/1992 | Shu et al. .............................. 395/800 |
| 5,170,484 | 12/1992 | Gorodalski ........................... 395/800 |
| 5,173,947 | 12/1992 | Chande et al. ....................... 382/41 |
| 5,175,862 | 12/1992 | Phelps et al. ........................ 395/800 |
| 5,175,865 | 12/1992 | Hillis ..................................... 395/800 |
| 5,181,017 | 1/1993 | Frey, Jr. et al. ..................... 340/825.02 |
| 5,187,801 | 2/1993 | Zenios et al. ........................ 395/800 |
| 5,189,665 | 2/1993 | Niehaus et al. ...................... 370/458.1 |
| 5,197,130 | 3/1993 | Chen et al. ........................... 395/325 |
| 5,212,773 | 5/1993 | Hillis ..................................... 395/200 |
| 5,212,777 | 5/1993 | Gove et al. ........................... 395/375 |
| 5,218,676 | 6/1993 | Ben-Ayed et al. ................... 395/200 |
| 5,218,709 | 6/1993 | Fijany et al. ......................... 395/800 |
| 5,230,079 | 7/1993 | Grondalski .......................... 395/800 |
| 5,239,629 | 8/1993 | Miller et al. ......................... 395/325 |
| 5,239,654 | 8/1993 | Ing-Simmons et al. ............ 395/800 |
| 5,251,097 | 10/1993 | Simmons et al. ................... 361/687 |
| 5,253,359 | 10/1993 | Spix et al. ............................ 395/575 |
| 5,265,124 | 11/1993 | Staab et al. .......................... 375/3 |
| 5,280,474 | 1/1994 | Nickolls et al. ..................... 370/60 |
| 5,297,260 | 3/1994 | Kametani ............................. 395/325 |
| 5,355,508 | 10/1994 | Kan ....................................... 395/800 |
| 5,367,636 | 11/1994 | Colley et al. ........................ 395/200 |

OTHER PUBLICATIONS

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimenaional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing the MasPar MP-1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP-1: A Cost Effective Massively Parallel Computer", 1990 IEEE, pp. 25–28.

J.F. Prins and J.A. Smith, "Parallel Sorting of Large Arrays on the MasPar MP-1, The 3rd Symposium on the Frontiers of Massively Parallel Computation", pp. 59–64, Oct., 1990.

J.B. Rosenberg and J.D. Becher, "Mapping Massive SIMD Parallelism onto Vector Architectures for Simulation", Software-Practice and Experience, vol. 19(8), pp. 739–756, Aug. 1989.

J.C. Tilton, "Porting an Interative Parallel Region Growing Algorithm from the MPP to the MasPar MP-1", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc., 1991.

"Symmetry 2000 Systems—Foundation for Information Advantage", Sequent Computer Systems Inc., 1990.

"Our Customers Have Something That Gives Them an Unfair Advantage", The nCUBE Parallel Software Environment, nCUBE Corporation., 1992.

Y.M. Leung, "Parallel Technology Mapping With Identification of Cells for Dynamic Cell Generation", Dissertation, Syracuse University, May 1992.

"The Connection Machine CM-5 Technical Summary", Thinking Machines Corporation, Oct., 1991.

Fineberg et al., "Experimental Analysis of a Mixed-Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, Hypercube Clock Synchronization:. Concurrency: Practice and Experience, vol. 4(3), pp. 257–268, May 1992.

T.H. Dunigan, "Performance of the Intel iPSC/860 and Ncube 6400 hypercubes *", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114, date unknown.

Baba et al., "A Parallel Object-Oriented Total Architecture: A-NET", Proceedings Supercomputing, Nov. 1990, pp. 276–285.

Mitchell et al., "Architectural Description of a New, Easily Expandable Self-Routing Computer Network Topology", IEEE INFOCOM, Apr. 1989, pp. 981–988.

K. Padmanabhan, "Hierarchical Communication in Cube-Connected Multiprocessors", The 10th International Conference on Distributed Computing Systems, May 1990, pp. 270–277.

Fineberg et al., "Experimental Analysis of Communication/Data-Conditional Aspects of a Mixed-Mode Parallel Architecture via Synthetic Computations", *Proceeding Supercomputing '90*, Nov. 1990, pp. 647–646.

Kan et al., "Parallel Processing on the CAP: Cellular Array Processor", *COMPCON 84*, 16 Sep. 1984, pp. 239–244.

Ezzedine et al., "A 16-bit Specialized Processor Design", *Integration The VLSI Journal*, vol. 6 No. 1, May 1988, pp. 101–110.

A. Mudrow, "High Speed Scientific Arithemetic Using a High Performance Sequencer", *ELECTRO*, vol. 6, No. 11, 1986, pp. 1–5.

Alleyne et al., "A Bit-Parallel, Word-Parallel, Massively Parallel Accociative Processor for Scientific Computing", *Third Symposium on the Frontiers of Massive Parallel Computation*, Oct. 8–10, 1990; pp. 176–185.

Jesshoppe et al., "Design of SIMD Microprocessor Array", *IEEE Proceedings*, vol. 136., May 1989, pp. 197–204.

DeGroot et al., "Image Processing Using the Sprint Multiprocesson", *IEEE*, 1989, pp. 173–176.

Nudd et al., "An Heterogeneous M-SIMD Architecture for Kalman Filter Controlled Processing of Image Sequences", *IEEE* 1992, pp. 842–845.

Li et al., "Polmorphic-Torus Network", IEEE Transactions on Computers, vol. 38, No. 9, Sep. 1989 pp. 1345–1351.

Li et al., "Sparse Matrix Vector Multiplication of Polymorphic-Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Isaac Schers, "Parallel Processing on VLSI Associative Memory", NSF Award #ECS–8404627, pp. 50–53, date unknown.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost-Effective Building-Blocks for Real-Time DSP Systems", Journal of VLSI Signal Processing, vol. 1, No. 1, Aug. 1989, pp. 69–84.

Isaac D. Scherson, et al., "Bit Parallel Arithmetic in a Massively-Parallel Associative Processor", IEEE, Vo. 41, No. 10, Oct. 1992.

Supreet Singh and Jia-Yuan Han, "Systolic arrays", IEEE, Feb. 1991.

H. Richter and G. Raupp, "Control of a Tokamak Fusion Esperiment by a Set of MULTITOP Parallel Computers", IEEE vol. 39, 1992, pp. 192–197.

Higuchi et al., "IXM2: A Parallel Associative Processor for Semantic Net Processing—Preliminary Evaluation—", IEEE, Jun. 1990, pp. 667–673.

Frison et al., "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE, Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1, 1989.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274. App. No. JP–820 125 341 (Tokyo Shibaura Denki KK) 27 Jan. 1984.

W.D. Hillis, *"The Connection Machine"*, The MIT Press, Chapters 1, 3, and 4, 1985.

"Joho–syori", vol. 26(3), 1985–3, pp. 213–225, (Japanese).

CONTROLLER FOR A SIMD/MIMD ARRAY HAVING AN INSTRUCTION SEQUENCER UTILIZING A CANNED ROUTINE LIBRARY

RELATED APPLICATIONS

This application is a continuation of U.S. patent application Ser. No. 07/887,459, filed May 22, 1992, now abandoned and a continuation-in-part of U.S. patent application Ser. No. 07/611,594, filed Nov. 13, 1990, now abandoned, and U.S. patent application Ser. No. 07/798,788, filed Nov. 27, 1991, now abandoned.

In addition, this application is related to the following applications filed concurrently herewith:

U.S. patent application Ser. No. 07/887,718, filed May 22, 1992, of P. A. Wilkinson et al., entitled "Instructions within a SIMD Processing Element" now abandoned; and U.S. patent application Ser. No. 07/887,514, filed May 22, 1992, of P. A. Wilkinson et al., entitled "Floating Point Implementation on a SIMD Machine" now abandoned; and U.S. patent application Ser. No. 07/887,455, filed May 22, 1992, of P. A. Wilkinson et al., entitled "Grouping of SIMD Pickets", now abandoned; and U.S. patent application Ser. No. 07/887,456, filed May 22, 1992, of P. A. Wilkinson et al., entitled "Slide Network for an Array Processor", now abandoned; and U.S. patent application Ser. No. 07/887,256, filed May 22, 1992, of P. A. Wilkinson et al., entitled "Picket Autonomy on a SIMD Machine" now abandoned; and U.S. patent application Ser. No. 07/887,459, filed May 22 1992, of R. R. Richardson et al., entitled "Controller Features for a SIMD/MIMD Machine" now abandoned; and U.S. patent application Ser. No. 07/887,997, filed May 22, 1992, of P. A. Wilkinson et al., entitled "Array Processor Communication Network Based on H-DOTS", now abandoned.

Further this application is related to:

U.S. patent application Ser. No. 07/887,630, filed May 22, 1992, of T. Barker, et al., entitled "Advanced Parallel Array Processor" now U.S. Pat. No. 5,590,345, and U.S. patent application Ser. No. 07/888,000, filed May 22, 1992, of T. Barker, et al., entitled "SIMD/MIMD Processing Memory Element" now abandoned; and U.S. patent application Ser. No. 07/887,262, filed May 22, 1992, of T. Barker, et al., entitled "PME Store and Forward/Circuit Switched Modes" now abandoned; and U.S. patent application Ser. No. 07/887,508, filed May 22, 1992, of T. Barker, et al., entitled "Fully Distributed Processing Memory Element" now abandoned; and U.S. patent application Ser. No. 07/887,612, filed May 22, 1992, of M. Dapp, et al., entitled "Advanced Parallel Processor Array Director" now abandoned; and U.S. patent application Ser. No. 07/887,512, filed May 22, 1992, of M. Dapp, et al., entitled "APAP Mechanical Packaging" now abandoned; and U.S. patent application Ser. No. 07/887,684, filed May 22, 1992, of T. Barker, et al., entitled "N-Dimensional Modified Hypercube" now abandoned; and U.S. patent application Ser. No. 07/887,258, filed May 22, 1992, of M. Dapp, et al., entitled "APAP I/O Programmable Router" now abandoned; and U.S. patent application Ser. No. 07/887,259, filed March 1992, of T. Barker, et al., entitled "APAP I/O Zipper Connection" now abandoned; and These co-pending applications and the present application are owned by one and the same assignee, International Business Machines Corporation of Armonk, N.Y.

The descriptions set forth in these co-pending applications are incorporated into the present application by reference.

CROSS REFERENCE TO OTHER CO-PENDING PATENT APPLICATIONS

Other commonly owned Co-Pending Applications also assigned to the same assignee as the present application at the time of filing include U.S. patent application Ser. No. 07/250,595, filed Sep. 27, 1988, now abandoned in favor of its continuation application Ser. No. 07/519,332, filed May 4, 1990 of James L. Taylor entitled "SIMD Array Processor" (which was originally published as EPO Application Serial No. 88307855/88-A on May 3, 1989); issued as U.S. Pat. No. 4,992,933 on Feb. 12, 1991 and U.S. patent application Ser. No. 07/193,990, filed May 13, 1988, of H. Li, entitled "Methods and Circuit for Implementing an Arbitrary Graph on a Polymorphic Mesh"; issued as U.S. Pat. No. 5,257,395 on Oct. 26, 1993 and U.S. patent application Ser. No. 07/426,140, filed Oct. 24, 1989, of R. Jaffe et al entitled "Two-Dimensional Input/Output Scheme for Massively Parallel SIMD Computers" now abandoned; and U.S. patent application Ser. No. 07/439,758, filed Nov. 21, 1989, of W. C. Dietrich, Jr. et al entitled "Method and Apparatus for Performing Memory Protection Operations in a Parallel Processor System" now abandoned; and U.S. patent application Ser. No. 07/698,866, filed May 13, 1991, of David B. Rolfe, entitled "Method for Interconnecting and System of Interconnected Processing Elements" now abandoned.

All above referenced co-pending applications are also are owned by one and the same assignee, namely, International Business Machines Corporation of Armonk, N.Y.

The descriptions set forth in these co-pending applications are also incorporated by reference.

FIELD OF THE INVENTION

This invention relates to computers and computer systems, particularly to arrays of processors and to the controlling elements that direct and monitor the operations of a SIMD array of processors capable of executing instructions autonomously within the PEs in a mode we call SIMIMD, or to controlling a SIMD/MIMD processor array.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units; or virtual components) attached to it. Our Cluster includes an array of PMEs sometimes called a Node array. Usually a cluster has 512 PMEs.

Our Entire PME node array consists of a set of clusters, each cluster supported by a cluster controller (CC).

Cluster controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234-3, where 0.1234 is the fixed-point part and -3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)**9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)**6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE relaxation solution process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32 k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing
 parallel numerically intensive processing
 physical array processing similar to images Picket Array A picket array is a collection of pickets arranged in a geometric order, a regular array.

PME or processor memory element

PME is used for a processor memory element. We use the term PME to refer to a single processor, memory and 110 capable system element or unit that forms one of our parallel array processors. A processor memory element is a term which encompasses a picket. A processor memory element is 1/nth of a processor array which comprises a processor, its associated memory control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

a Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means $(10)^{**}12$ floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. Ser. No. 601,594 and our Advanced Parallel Array Processor (APAP). System tradeoffs are required to pick the architecture which best suits a particular application but no single solution has been satisfactory. Our ideas make it easier to provide a solution.

As background for our invention, we will review some patents which relate as background to controllers for array processors, but the reader is referred additionally to the background of the related applications identified above.

U.S. Pat. No. 4,412,303 of Barnes, entitled "Array Processor Architecture," illustrates how thinking in the art developed after over a decade of apparent progress. As large array processors were developed, they became tightly coupled processors whose interconnection and controls became designed to execute problems common either to MIMD array architecture or to SIMD array architecture. The SIMD architecture became quite complex, a long way from the simple facilities we have provided for executing instructions within a picket. This U.S. Pat. No. 4,412,303 describes an array of FORTRAN processors which have memory modules interconnected with an Omega network. A single control/data memory and related controller monitor the array; however, program and data information are distributed to separate processors and memory such that each processor has its own copy of the software. Processor array synchronization is accomplished by using an approach of synchronization on a computational envelope. All processors are required to wait for each other at a predetermined stopping point in a program. The architecture allows each processor in an array to execute independently of the other processors and occasionally to share control or data information in a manner common to large multiprocessors. The architecture also allows the processors to execute the same software on an array of data in a manner that gives the effect of a SIMD architecture. In this mode, the array of processors are synchronized before they are required to share data with other processors or neighbors.

U.S. Pat. No. 4,314,349 of Batcher, entitled "Processing Element for Parallel Array Processors." illustrates a classical SIMD array processor element. While this patent relates to an application intended for satellite image processing, it describes in detail a classic bit serial SIMD array processor, a processor in the sense we refer to as applicable to the tasks which need to be improved. Unlike our own SIMD array processor, but like the classical SIMD elements of such manufacturers as Thinking Machines, Inc., the processor is bit serial, while ours is processes data streams in parallel.

U.S. Pat. No. 4,706,191 of Hamstra, entitled "Local Store for Scientific Vector Processor," describes generally the implementation of a local store memory in a scientific vector processor.

U.S. Pat. No. 4,720,780 of Dolecek, entitled "Memory-linked Wavefront Array Processor," describes a systolic array processor using fully capable SISD processors linked on their edges with blocks of memory for pipelined or systolic processing where processing is complex and there is a desire for identifiable and immediate results. The systems of U.S. Pat. Nos. 4,720,780 and 4,706,191 do not have the capability of execution of instructions within a SIMD processing element of an array of processors.

U.S. Pat. No. 4,873,626 of Gifford, entitled "Parallel Processing System with Processor Array having Memory System included in System Memory," illustrates the complexity of the development of the art by the busing hierarchy and memory architecture of a parallel processor capable of operating in SIMD or MIMD mode, with a control structure for managing hierarchial busing and control structure.

U.S. Pat. No. 4,891,787 of Gifford, entitled "Parallel Processing System with Processor Array having SIMD/MIMD Instruction Processing," claims a different aspect of the same system as U.S. Pat. No. 4,873,626, also of Gifford. This U.S. Pat. No. 4,891,787 describes the processor as having a controlling CPU, a sequencer, I/O units, and an array of Memory/Processing Elements arranged in hierarchical groups by the busing structure. The memory of each M/PE is mapped as a part of the controlling CPU's memory. Each M/PE can execute instructions contained within its own memory giving it the MIMD capability. While in MIMD mode, the controlling CPU can issue a SIMD instruction to the M/PEs. The M/PEs respond as one when taking an interrupt, execute the SIMD instruction, and then resume executing their own MIMD instruction stream. When not in MIMD mode, the M/PEs only respond to SIMD commands from the controlling CPU, the input/output unit, another M/PE (presumably of higher stature), or from a sequencer unit. No mention is made as to the complexity of the SIMID instructions. They could be at a subroutine level, in, which case the SIMD commands become equivalent to subroutine calls to the M/PE. This is supported by the path that SIMD instructions take to get from the controlling CPU to the M/PEs. No mention is made in this patent of the degree of parallelism in the PEs, but it shall be understood that a PE is comparable to a card with a processor chip, some memory, and interfaces to inter-group bus, the group bus, and control as separate elements on a card, with multiple cards interconnected by the busing structure. The instruction stream control structure is not described. There is no instruction stream controller, as we will describe. Instead, the Gifford MIMD array simulates SIMD operations by restricting the M/PEs to responding to SIMD calls when not in MIMD mode. Our own approach provides a SIMD array in a more classical sense, but we provide the system with expanded local autonomous functions that permit a precise string of SIMD commands to step through the execution of unique instructions within each picket.

In our case, we address controllers for parallel array processors. The control of a large parallel array whose organization is SIMD or SIMD/MIMD presents several problems.

The first problem is keeping the array working efficiently. That is, (a) keeping the maximum number of array elements working on the problem, and (b) taking care of any overhead control operations outside of the array without impacting its performance. This means that the array must be fed with a continuous stream of pre-decoded instructions such that the array is not waiting for commands.

The operations within an array are computational, and, generally, quite iterative. It is desirable to keep most control functions out of the array to maintain efficiency. The processing of the counts and vectors associated with iteration and the processing of decision making commands are the primary functions being processed that do not involve the elements of the array and thus should be handled outside of the array.

A second problem addressed is the hierarchical breakdown of a problem into sub-units suitable for parallel execution on the array. Starting with a large complex problem that can be described with large functions (and accompanying control variables and constants) we need to partition the functions and data base(s) into smaller functions. At some point, these functions become recognizable as members of a family (e.g.: trigonometric, matrix, vector, filter, image processing functions, etc.) suitable for machine level programming.

These "standard" functions that relate to the present task being performed must be readily accessable for execution. Providing controller hardware functions to support, optimize, store, and allow fast access to these machine level programs defines the functional requirements for controlling SIMD/MIMD machines.

These problems and others are solved with the controller described and the collection of ideas that make it up.

SUMMARY OF THE INVENTION

The controller of the PARALLEL ASSOCIATIVE PROCESSOR SYSTEM contains several features for interpreting the application program instructions and controlling the array of pickets to execute commands in either a SIMD or a MIMD control structure. Several of these features, when taken together and separately, provide unique controls for an array of processors operating in either SIMD or MIMD mode.

Figure 1:
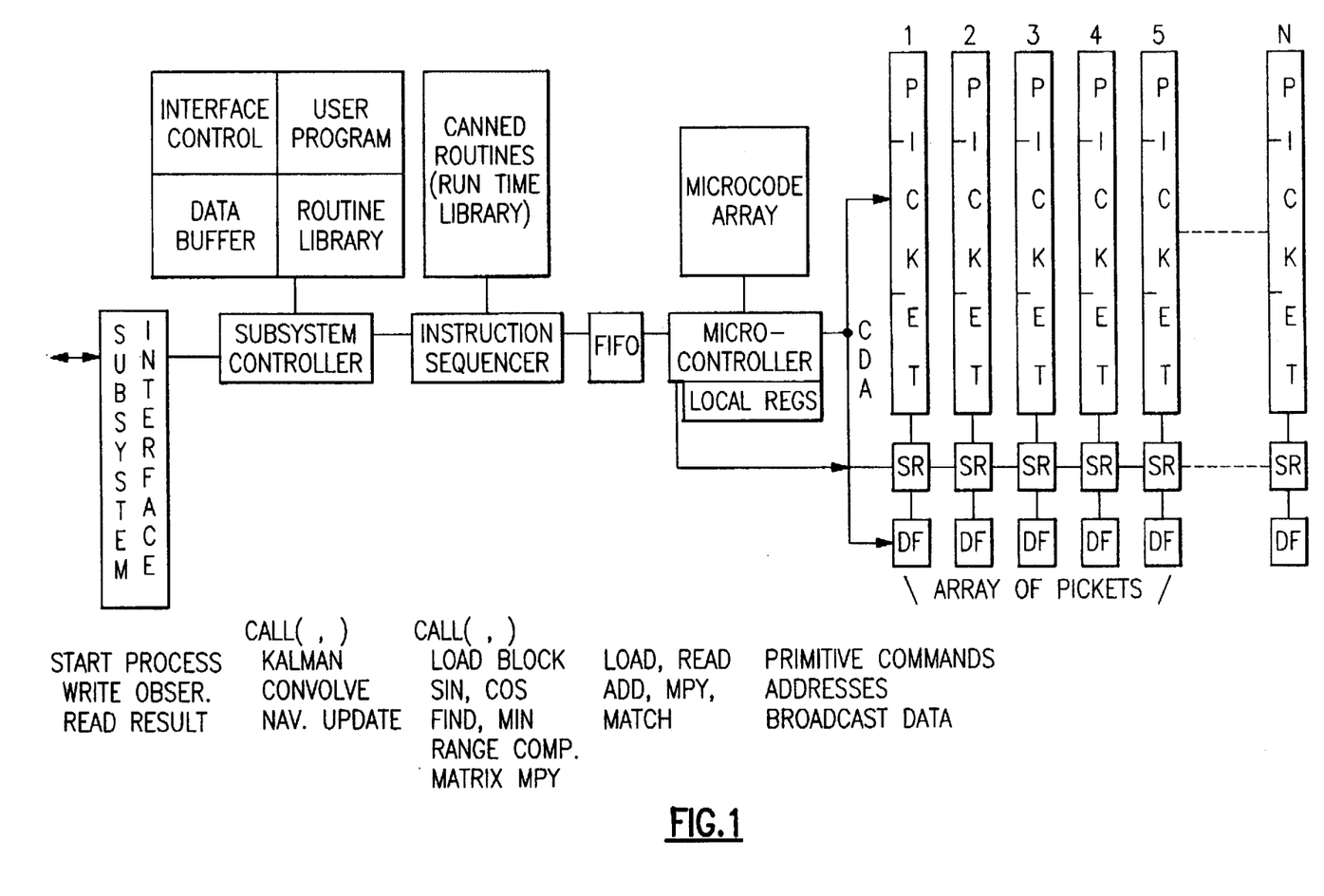
FIG. 1 is the ARRAY BLOCK DIAGRAM showing a typical implementation of an array of processing elements including control means and communication paths. Ultimate control begins either in the User Program in the subsystem controller or alternatively from outside the subsystem interface.
Figure 2:
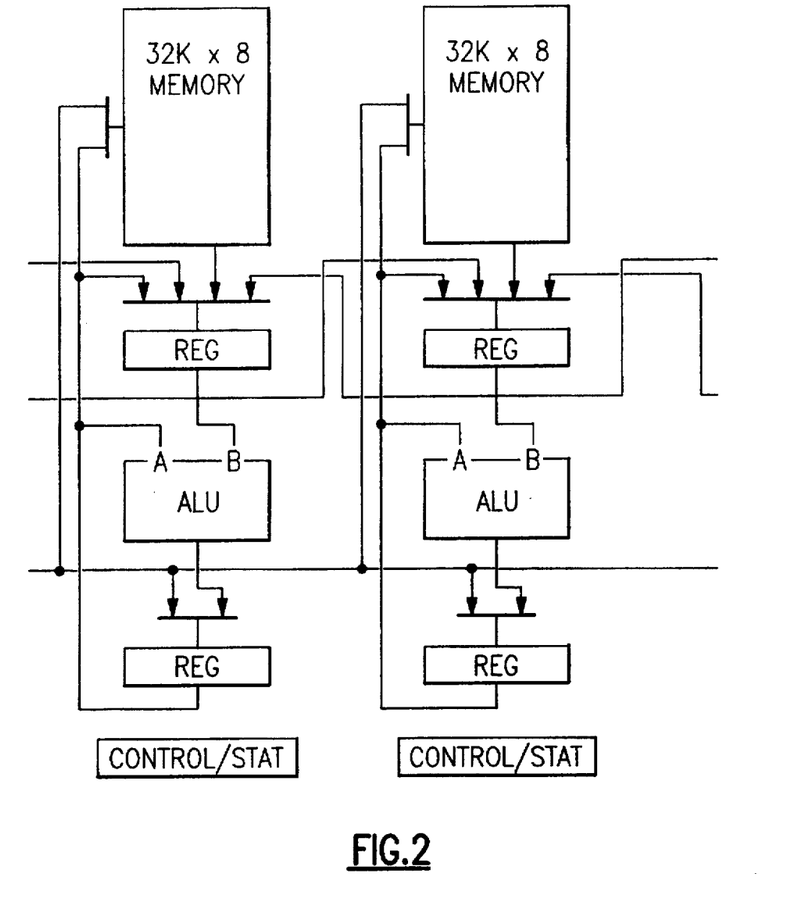
FIG. 2 shows more detail of two of the 'pickets' shown in FIG. 1. The slide register which can implement picket to picket communications is shown between the memory block and the ALU block.

The controller has four distinct sections as portrayed in FIG. 1. The array of processing elements or pickets performs the execution of operations on many sets of data in parallel. The Micro-controller supplies the array with clock-by-clock commands from linear sequences in its microcode array. The Instruction Sequencer controls the looping and decision making and feeds start addresses through a FIFO buffer to the Micro-controller. And finally, the Subsystem Controller feeds commands to the sequencer that sequences major functions. It also provides a host environment for controlling and testing overall system status.

The improvements which we have made achieve instruction execution in hierarchical and overlapped or pipelined form primarily to optimize the continuous flow of instructions to the array of processors. User program code in the Subsystem Controller provides high level commands that generally call out and give parameters to routines in a Run Time Library. The runtime routines are executed in the Instruction Sequencer where nearly all program flow decisions are made using simple hardwired DO WHILE IF FOR control structures and counters and address information contained within the Local Registers. The Instruction Sequencer identifies linear routines of microinstructions that are sequenced to the elements of the array of processors in parallel for commanding the microsteps of each PE as it operates on its set of data.

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMiD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be direction by either of two ways, where as a first way, an array controller directs that all messages move in the same direction at the same time such that the data being moved does not define its destination, and in a second way, each message is self routed with a header at the beginning of a message defining its destination.

A segment of the parallel array processor array has plural copies of the processing unit is provided on a single semiconductor chip, which each copy segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES.

BRIEF DESCRIPTION OF THE DRAWINGS.

We will describe our preferred embodiment in relation to the accompanying drawings.

DISCUSSION OF CONTROLLER FOR A SIMD/MIMD PROCESSOR ARRAY

The controller of the PARALLEL ASSOCIATIVE PROCESSOR SYSTEM contains several features for interpreting the application program instructions and controlling the array of pickets to execute commands in either a SIMD or a MIMD control structure. Several of these features, when taken together and separately, provide unique controls for an array of processors operating in either SIMD or MIMD mode.

FIG. 1 shows a block diagram of the three level array controller attached to an array of processing elements. The term picket is used to describe one of the elements of the array consisting of an execution data flow (DF), a communication shift register or slide register (SR), and a strip of memory containing the data for the picket.

First, we will discuss the picket and its capabilities. A picket contains an ALU, memory, several registers, and communication paths. All pickets receive the same command from the controller. A command consists of the primitive signals that supply the memory address and tell the ALU, registers, and data multiplexers what to do. The multibyte-wide dataflow supports the following data formats.

8, 16, 32 bit fixed point 40 bit Floating point (25 bit dynamic accuracy)

The controller has four distinct sections. The array of processing elements or pickets performs the execution of operations on many sets of data in parallel. The Microcontroller supplies the array with clock-by-clock commands from linear sequences in its microcode array. The Instruction Sequencer controls the looping and decision making and feeds start addresses through a FIFO buffer to the Microcontroller. Finally, the Subsystem Controller feeds commands to the sequencer that sequences major functions. It also provides a host environment for controlling and testing overall system status.

This partitioning of the execution steps and the introduction of a FIFO file will keep the array optimally busy. This organization is key to maintaining efficient array operation.

MICRO-CONTROL

Control closest to the array is microcoded similarly to the organization of recent uni-processors. The MICRO-CONTROLer issues a micro-command in parallel to all of the elements of the array synchronized to the array clock cycle to control the micro-orders of the ALU, data paths, and memory. When in SIMD mode, the micro-orders, data addresses, and data feed all of the array elements and they all do the same thing. The microcode array contains many small linear micro-routines used to perform all or portions of instructions within the pickets. Each of these microroutines has a beginning address and contains from one to about 50 instructions. Execution of the microcode begins at a specified address and runs incrementally through the string of commands required to accomplish a specific task.

The microcontroller also has the task of presenting data simultaneously to the entire array for use by all of the elements using the broadcast bus. This is also generally used in a load or compare operation.

The MICRO-CONTROL portion of the controller also loads and updates the set of common local store registers. These registers provide global addresses and data for all of the pickets.

When the array is operating in MIMD mode, with each picket doing an independent operation, the MICRO-CONTROL still issues micro-orders, data, and data addresses to the array elements; however, now the string of commands form the instruction execution sequence in each picket. The MIMD opcodes are fetched from the memory of each picket, and put into an op register where they are executed in subsequent microcycles.

The MICRO-CONTROL portion of the controller provides feedback from the array for process control. This is accomplished by issuing a micro-order to the array that causes each element of the array to gate a stat bit into the STATUS FUNNEL. The STAT FUNNEL is a hardware mechanism for bringing the collective status from the array to the controller as a concise piece of information that is normally less than a byte in size. If the bit in any element is set to a logic one, the STATUS FUNNEL will give that logical one to the controller for use in decision making. This decision making occurs in the INSTRUCTION SEQUENCER to be discussed next.

A FIFO buffer sits at the input to the MICRO-CONTROLLER so that the upstream part of the controller can work ahead. This keeps the parallel array and the micro-controller working most of the time.

INSTRUCTION SEQUENCER

The Instruction sequencer feeds beginning addresses to the MICRO-CONTROL unit. When the MICRO-CONTROL unit finishes a sequence, it signals the Instruction Sequencer for the next starting address. The Instruction Sequencer is hardwired to perform FOR, WHILE, DO and IF type operations both effectively and in parallel with micro-control operations. The iteration capability of the Instruction Sequencer is required to extend the byte-wide operations of the array elements to the common multi-byte-wide sequences needed for arithmetic.

Isolating the Instruction Sequencer from the Micro-Control function is a unique step which provides some hardware effectiveness gain. The instruction sequencer is made available to both the low level functions (doing a floating point add) and to upper level functions (like math functions (sin x), matrix functions, vector arithmetic operations (sum over all pickets) and any unique operations which optimize some applications). Some of the instructions in the macros are used to initiate microsequences in the MICRO-CONTROLLER. Others are loop control and decision instructions for iterative control within the macros. This permits the same hardware to service both the application and the microcode programmer.

Figure 4:
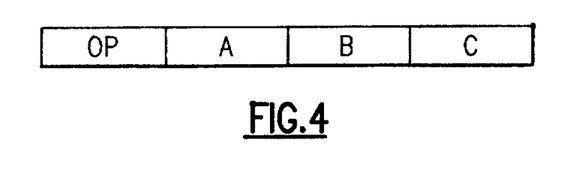
FIG. 4 shows the operation code format common to three stages of the controller described.

The INSTRUCTION SEQUENCER gets its instructions from the Canned Routine memory (Run Time Library) or the SUBSYSTEM CONTROLLER. Instructions from the Subsystem Controller can set up looping conditions, can directly control the micro-controller, or evoke sequences from the canned routine memory. These instructions have a common four byte Instruction format as shown in FIG. 4. OP represents the operation to be executed; B and C generally refer to the two data sources of an operation, and A identifies where the result is to be stored.

The instructions at this level either control the execution sequence or kick off MICRO-CONTROLLER instructions. The Instruction Sequencer directly executes the following set of instructions.

GO-SUB ... RETURN—Call a subroutine located in the Canned Routine Memory.

IF condition met THEN ELSE—Take one of two paths based on the condition provided collectively by all of the active pickets in the parallel array.

DO . . . NEXT—First load a counter with the iteration count, then do the string of instructions between the DO and the NEXT until the counter reaches zero.

DO IMMEDIATE . . . NEXT—Load a counter with the immediate value, then do the string of instructions between the DO and the NEXT until the counter reaches zero.

DO . . . NEXT IF—First load a counter with the iteration count, then do the string of instructions between the DO and the NEXT until the counter reaches zero, or until a condition is met based on the condition provided collectively by all of the pickets in the parallel array.

START MICRO-CONTROLLER at X—Initiate a sequence of array control functions in the MICRO-CONTROLLER beginning at address X.

The INSTRUCTION SEQUENCER accepts 5 commands from the SUBSYSTEM CONTROLLER. They are described next.

FILL CAN(ned Routine Memory), and

END FILL—Commands the SUBSYSTEM CONTROLLER uses to load routines into the Canned Routine Library memory.

LOAD COUNTER—Loads any of the control counters. They can contain the DO loop counts for all of the loops at all levels of subroutine nesting.

Note: Some Loop counter values can be from the Canned routine memory.

START—Specifies the beginning address of a control routine in the Canned Routine Memory START MICRO-CONTROLLER at addr X—The SUBSYSTEM CONTROLLER can bypass the INSTRUCTION SEQUENCER and initiate sequences in the MICRO-CONTROLLER. Thus, a little used or 'NEW' routine can be executed on the array directly from the SUBSYSTEM CONTROLLER without first loading the Canned Routine Memory.

SUBSYSTEM CONTROLLER

The application program, coded in the user's choice of language, resides and executes in the system controller. That program executes as a single thread of instructions and provides the high level control for the processor array. Structurally, the application program can be considered to be:

1. Run time functions to output commands to the instruction sequencer,
2. Compile and run time functions that generate the addressing and indexing controls for the Instruction sequencer commands; and,
3. Memory maps for data and register spaces in the instruction sequencer, microcontroller, and processor array.

To make the work manageable for the application programmer, his program will be supported by a set of run time services which he invokes by CALL, and which in turn, interface to the instruction sequencer. FIFO memory in the instruction path provides the buffering to isolate workload fluctuations between the levels.

The Subsystem Controller supplies high level control of the processing array. It may also supply commands at a low level to directly control the microcontroller. It also serves as the data path for data going into and out of the array or other portions of the controller.

The subsystem Controller permits control of a parallel array processor having a SIMD or a MIMD architecture using a nearly conventional SISD machine organization. The programmer will have different levels of awareness of the programming techniques. Exceptions to the SISD view occur in the several areas where data moves from picket to picket. Below is a list of some activities and the degree of array awareness.

Not aware of more that one—SIMD math, all pickets are do independent things, data flow Mildly aware—Picket grouping is based on content or results; Inter-picket communication (image processing); Broadcast to all active pickets.

Definite awareness—Individual picket control:

Load it

Enable/disable

Read it

CONTROL STRUCTURE

Figure 3:
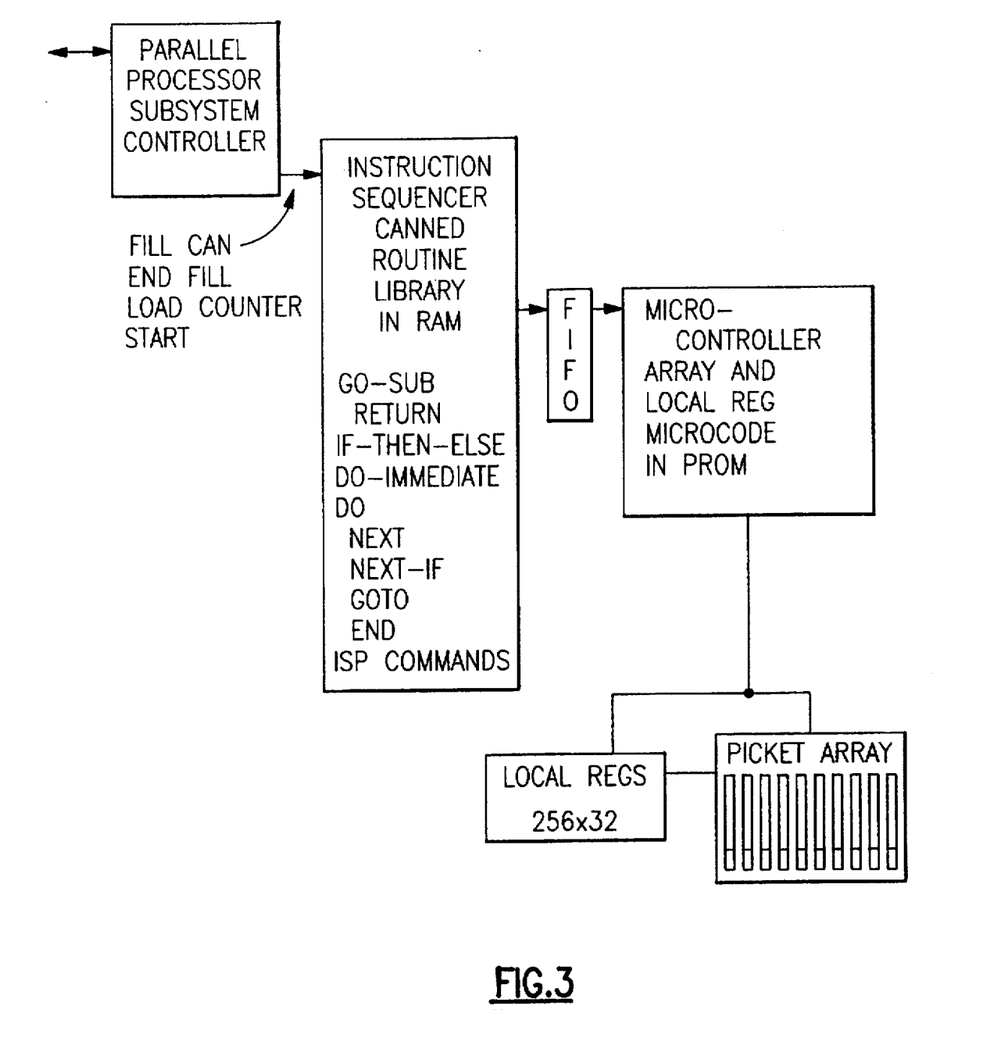
FIG. 3 outlines the flow of control and the levels of control within the controller of an array of processors. A small FIFO situated between the instruction sequencer and the Microcontroller promotes a more continuous flow of commands to the array of processors.

The control structure of the controller is summarized in FIG. 3. Note that the Micro-controller is fed from a FIFO and fully controls the array and local store in clock sync with each other.

The Instruction Sequencer gets its commands from the Subsystem Controller which commands it to execute routines that are generally organized as canned routines (subroutine library) contained in memory in the Instruction Sequencer. The instructions that are executed at this point we will call ISP commands. The implementation of these commands is a combination of canned routines and Microcode located in PROM and/or RAM in the Micro-controller.

INSTRUCTION SET

Below is listed the low level Instruction Sequencer instruction set. The numbers 8, 16, 32, 40 refer to the operand sizes. Several catagories of instructions are listed below.

LOCAL REGISTER OPERATIONS

ARRAY OPERATIONS WITHIN PICKETS—ARITHMETIC

ARRAY OPERATIONS WITHIN PICKETS—CONVERSION

ARRAY OPERATIONS ACROSS PICKETS—ARITHMETIC

PICKET LOAD/READ

ARRAY CONTROL

These instructions are set forth below. These commands are implemented in the ISP Microcode, controlled by the Instruction Sequencer and are executed in the picket array and around the Local Store.

Local Regs

LOAD-REGS. Store the VALUE in the Local Reg A.

ADD-REGS. Add the value in reg C to the value in Reg B and store in A.

SUB-REGS. SUB the value in Reg C from the value in Reg B and store in A.

AND-REGS. Logical AINID the val. in C with the val. in B and store in A.

ADD-REGS IMMED. Add the immediate val. to the val. in C and store in A.

SUB-REGS IMMED. Sub the immediate val. from the val. in C and store in A.

READ-REGS. Move the value in Reg A to the subsystem controller.

PICKET Instructions—Arithmetic

---

MOV8  Move the value contained in picket memory location specified by Reg C to the picket memory location specified by Reg A.

-continued

| | |
|---|---|
| ADD32 | Add the 32 bit fixed point value contained in picket memory location specified by Reg B to the 32 bit fixed point value contained in picket memory location specified by Reg C and store the 32 bit fixed point result in the picket memory location specified by Reg B. |
| MPY40 | Add the 40 bit floating point value contained in picket memory location specified by Reg B to the 40 bit floating point value contained in picket memory location specified by Reg C and store the 40 bit floating point result in the picket memory location specified by Reg B. |

All of these instructions have implementations similar to those above.

| | | | |
|---|---|---|---|
| MOV8 | MOV16 | MOV32 | MOV40 |
| CMP8 | | | |
| ADD8 | ADD16 | ADD32 | ADD40 |
| SUB8 | SUB16 | SUB32 | SUB40 |
| | MUL16 | MUL32 | MUL40 |
| | DIV16 | DIV32 | DIV40 |
| | | MOD32 | MOD40 |
| | | | SQR40 |
| ABS8 | ABS16 | ABS32 | ABS40 |
| NEG8 | NEG16 | NEG32 | NEG40 |
| AND8 | AND16 | AND32 | |
| OR8 | OR16 | OR32 | |
| XOR8 | XOR16 | XOR32 | |
| NOT8 | NOT16 | NOT32 | |
| SHIFT8L | SHIFT16L | SHIFT32L | |
| SHIFT8R | SHIFT16R | SHIFT32R | |
| | | | FLOOR40 |
| | | | CEILing40 |

PICKET Instructions—Conversion

| | |
|---|---|
| FLT-TO-FIX. | Convert the 40 bit floating point value in picket Memory specified Reg C to a 32 bit Fixed point value and store in picket memory at location specified by Reg A. |
| FIX-TO-FLT. | Convert the 32 bit fix to 40 bit flt. |
| FLT-TO-CC2. | Convert the 40 bit flt. to a CC2 Floating point value. |
| CC2-TO-FLT. | Convert the CC-2 format floating point value to 40 bit float. |

PICKET Instructions—Across pickets

| | |
|---|---|
| HSUM8. | Horizontally add the 8 bit value in picket Memory location specified by Reg C with the value from all of the pickets and store the 32 bit result in the picket memory location specified by Reg A in the picket specified by Reg B. |
| HMIN40. | Horizontally compare the 40 bit floating point value in picket memory location specified by Reg C with the value from all of the pickets and store the 40 bit minimum value in the picket memory location specified by Reg A in the picket specified by Reg B. |
| HSUM40. | hfind16 |
| HMIN8. | hfind32 |
| HMIN40. | hsorte16 |
| HMAX8. | hsorto16 |
| HMAX40. | hsorte32 |
| HFIND8. | hsorto32 |
| HFIND40. | hsorte40 |
| HSORTE8. | hsorto40 |
| HSORTO8. | hmove slideL1 |
| HFIND40. | hmove slideL2 |
| hmin16 | hmove slideL4 |
| hmin32 | hmove slideL8 |
| hmax16 | hmove slideR1 |
| hmax32 | hmove slideR2 |
| | hmove slideR4 |
| | hmove slideR8 |
| Range Compare | |

PICKET Instructions—picket Load/Read

| | |
|---|---|
| BLOAD DATA. | The 32 bit words following this header are loaded into the picket specified by Reg B beginning at picket memory location specified by Reg A. |
| HBLOAD DATA. | The 32 bit words following this header are loaded into all active pickets beginning at picket memory location specified by Reg A. |
| HLOAD16. | Move the value in Reg B to the picket Memory location specified by Reg A of all active pickets. |
| LOAD16. | Move the value in Reg B to the picket Memory location specified by Reg A of picket specified by Reg B. |
| BREAD DATA. | A Block of 32 bit words is fetched from the picket specified by Reg B beginning at picket memory address specified by Reg C into the Controller specified memory. |
| READ16. | Move the value in the picket Memory location specified by Reg C of the picket specified by Reg B into Reg A. |

PICKET Instructions—picket Control
The modes are:

| | |
|---|---|
| ACTIVE | All instructions are fully operational within the picket. |
| DOZE | All instructions are at least partially operational. All arithmetic and tests are made, but Stores to the picket memory are inhibited (or at least very restricted) A dozing picket is a useful participant in the problem but is temporarily waiting until its turn to participitate . . . until it, along with others, is reawakened. |
| DISABLED | A disabled picket is an active picket that has been temporarily set "inactive" by the SubSystem Controller. The controller can turn it back on again. |
| INACTIVE | An inactive picket is not participating. its SR-Latch is transparent in both directions. If it is needed, the inactive picket can be turned on using its physical address and initialized by the subsystem controller. |
| BROKEN | picket is turned fully off including making the SR-Latch transparent to both directions. It cannot be reactivated except by power-on. |

ARRAY CONTROL instructions

| | |
|---|---|
| HADDR. | The Physical picket address of the leftmost active picket . . . |
| HDISAB. | Disables the picket whose physical picket address is . . . |
| HDOZE. | The picket Stat latch is used to set the picket Doze . . . |
| HAWAKE. | The picket Stat latch is used to reset the picket Doze . . . |
| HGROUP. | The picket Stat latch condition is moved to the picket . . . |
| SET-ARRAY-STAT. | The picket Stat latch condition is moved to . . . |
| READ-CHIP-STATUS. | The Chip Stat latch in the chip specified in . . . |
| LOAD-CHIP-ENABLE. | The Chip Enable Reg in the chip specified in . . . |

Set—Array Operations
 Selected picket Enable/Disable per stat
 Get picket Status
 Get Chip Status
 MICROA. Pass first half of a microword directly to the ISP output.
 MICROB. Pass second half of a microword directly to the ISP output.
 INTERRUPT. Interrupt the Subsystem controller and pass the interrupt

A CONTROL EXAMPLE

The following example shows the close interrelationship between the various parts of the controller. The example is matrix multiply where all of the elements of one matrix multiply are in one picket. The code provides for an independent matrix multiply executed in each picket. A parallel multiply has much of the same function, but this adds inter-picket data transfers in an effect manner.

In the column called Execution are the numbers 0, 1, 2, 3 which refer to the part of the array processor that is performing the step. The references are:

0 Subsystem Controller,

1 Instruction Sequencer,

2 Micro-controller Executing Local Store Instructions, and

3 Micro-controller Executing Array Instructions.

The column Cycles 10×10 is the total count of cycles (time) that each part of the machine spends in each function. Note that most of the time is spent computing. Note also, the time spent computing is amplified by the number of pickets to reach a measure of computing power. Performance cannot be directly computed for the cycle time as this depends upon the actual time used in each system.

In the summary below, we see the number of cycles spent in each portion of the machine in column A. Column B shows the percentage of cycles in each section of the controller. Column C shows the percentage of time spent in the pickets when we consider that the FIFO will cause the processing that is allocated to the subsystem controller and the instruction sequencer to be hidden.

MATRIX MULTIPLY [X] × [Y] = [Z]

$$R \begin{bmatrix} x1 & xR+1 & \ldots \\ \cdot & \cdot & \\ \cdot & \cdot & \\ xR & x2R & \ldots xR \times M \end{bmatrix} \times M \begin{bmatrix} y1 & yR+1 & \ldots \\ \cdot & \cdot & \\ \cdot & \cdot & \\ \cdot & \cdot & \\ yR & y2R & \ldots yM \times C \end{bmatrix} = R \begin{bmatrix} z1 & zR+1 & \ldots \\ \cdot & \cdot & \\ \cdot & \cdot & \\ zR & z2R & \ldots zR+C \end{bmatrix}$$

| | Execution | | | | | Cycles/ | Cycles 10 × 10 × |
|---|---|---|---|---|---|---|---|
| | 0 | 1 | 2 | 3 | Passes | Pass | 10 × 10 |
| CALL Matrix Mult Fx (R,M,C, Xaddr,Yaddr,Zaddr) | x | | | | 1 | c* | |
| xSUB = ySUB = zSUB = 1 | | x | | | 1 | 3 | 3 |
| DO I = 1 to C | | x | | | 1 | 3 | 3 |
| DO J = 1 to R | | x | | | C | 3 | 10 |
| z = 0 | | | x | | C × R | 5/6 | 600 |
| DO K = 1 to M | | x | | | C × R | 3 | 300 |
| Zz = Xx × Yy + Zz | | | | x | C × R × M | 250* | 250,000 |
| xSUB = xSUB + R | | | x | | C × R × M | 2 | 2,000 |
| ySUB = ySUB + 1 | | | x | | C × R × M | 2 | 2,000 |
| NEXT K | | x | | | C × R × M | 3 | 3,000 |
| xSUB = xSUB − M × R + 1 | | | x | | C × R | 2 | 200 |
| ySUB = ySUB − M | | | x | | C × R | 2 | 200 |
| zSUB = zSUB + 1 | | | x | | C × R | 2 | 200 |
| NEXT J | | x | | | C × R | 3 | 300 |
| xSUB = 1 | | | x | | C | 2 | 20 |
| NEXT I | | x | | | C | 3 | 30 |
| END Call | | x | | | 1 | 1 | 1 |

| | A | B | C |
|---|---|---|---|
| Array | 250,000 | 96.6% | 98.8% |
| Local Store | 5,223 | 2.0% | 2.0% |
| Sequencer | 3,644 | 1.4% | 0.0% |
| Controller | c | | 0.0% |
| total | 258,868 | 100.0% | |

*Average cycles for Fixed Floating Point Operations

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A controller for an array of processing elements which are coupled for intercommunications, each processing element having a SIMD and a MIMD mode of operation, the controller comprised of:

a micro-controller having a micro-controller array for storing at least one micro-routine, each micro-routine having one or more micro-commands, the micro-controller supplying the array of processing elements with commands, data, addresses, indexes, and counters in accordance with the micro-commands;

an instruction sequencer having a canned routine library, each canned routined consisting of one or more instructions, the instruction sequencer coupled to the micro-controller, the instruction sequencer interprets instructions received from a subsystem controller or the canned routine library, whereby the instruction sequencer controls the sequencing of the micro-controller by providing the micro-controller with a micro-command or a starting address of a micro-routine in the micro-controller array; and, the subsystem controller coupled to the instruction sequencer, the subsystem controller providing instructions or an address of a canned routine in the canned routine library to the instruction sequencer;

wherein the controller is separate from the array of processing elements and controls individual processing elements to operate in either a SIMD or a MIMD mode;

wherein the array of processing elements provides a multi-processor memory system including a PME architecture multi-processor memory element on a single semiconductor substrate which functions as a system node, said multi-processor memory element including said plurality of processing memory elements, and means on said substrate for distributing interconnection and controls within the multi-processor memory system node enabling the system to perform SIMD/MIMD functions as a multi-processor memory system, wherein each dedicated local memory is independently accessible by the respectively coupled processor in both SIMD and MIMD modes exclusive of access by another processor.

2. The controller of claim 1 wherein each processing element of the processing element array is a picket which includes data flow, memory, control, and communication.

3. The controller according to claim 2 wherein the micro-controller sends commands, data, addresses, indexes, and counter values simultaneously of all of the pickets in the array of pickets.

4. The controller according to claim 3 having a common clock used by the micro-controller and the array of pickets such that each picket receives commands, data, addresses, indexes, and counter values during a single clock cycle of the common clock.

5. The controller according to claim 3 wherein the micro-controller supplies micro-orders to each picket.

6. The controller according to claim 3 wherein the micro-controller array store commands, data, addresses, indexes and counter values as microcontrol words.

7. The controller according to claim 3 wherein the micro-controller monitors all of the pickets in the array of pickets and provides a Status for all of the pickets in the array to the instruction sequencer.

8. The controller according to claim 7 wherein the micro-controller obtains status through a set of signal lines one for each picket.

9. The controller according to claim 8 wherein each picket that satisfies a specific condition drives its signal line to an active state.

10. The controller according to claim 7 wherein the status is obtained through a set of signal lines that are latched in the controller.

11. A SIMIMD array processor controller with a SEQUENCER stage according to claim 7 which sequences of commands are starting addresses for linear sequences in the Microcontrol stage.

12. The controller according to claim 7 where the instruction sequencer has instructions that interpret the status from the microcontroller or pass the status to the subsystem controller.

13. The controller according to claim 2 wherein the instruction sequencer is coupled to the micro-controller by a FIFO buffer, the FIFO buffer accepting micro-commands and starting addresses of micro-routines from the instruction sequencer and dispensing these to the micro-controller when the micro-controller has completed a previous micro-command or a micro-routine.

14. The controller according to claim 2 in which the subsystem controller receives a high level command from a host and carries out the high level command using a combination of the canned routines in the instruction sequencer and micro-routines stored in the micro-controller array.

15. The controller according to claim 2 in which a common command format is shared by the micro-controller, the instruction sequencer and the subsystem controller.

16. The controller according to claim 2 wherein the micro-controller also sends commands, data, addresses, indexes, and counter values to a Local Store within the Controller.

17. The controller according to claim 16 wherein the micro-controller maintains active data, addresses, indexes, and counter values in a plurality of local registers.

18. The controller according to claim 16 wherein the micro-controller determines the addresses, indexes and counter values located in the plurality of local registers using an adder and data flow facilities.

19. The controller according to claim 2 wherein the instruction sequencer provides for iteration control functions for the array of pickets.

20. The controller according to claim 19 in which the iteration control function are implemented in hardwired logic.

21. The controller according to claim 2 in which the canned routines include at least one of the following functions: a Floating Point Add, a Matrix Multiply, a Sin, and a cosine.

22. A controller for a computer system for SIMD processing with an array of processors which execute instructions in parallel, comprising a plurality of picket array processing elements which are coupled for intercommunication of data and instructions, each picket having data flow, memory, and plural mechanisms providing each picket with a variety of execution modes for operation upon data within the picket and for interpretation of SIMD commands within the picket, such variety of execution modes being referred to as SIMIMD;

wherein the computer system provides a multi-processor memory system including EL PME architecture multi-processor memory element on a single semiconductor substrate which functions as a system node, said multi-processor memory element including said plurality of processing memory elements, and means on said substrate for distributing interconnection and controls within the multi-processor memory system node enabling the system to perform SIMD/MIMD functions as a multi-processor memory system, wherein each dedicated local memory is independently accessible by the respectively coupled processor in both SIMD and MIMD modes exclusive of access by another processor.

* * * * *